March 19, 1968     P. K. SCHILLING     3,373,890

CONTAINER FOR CONTAINING FROZEN FOOD

Filed July 5, 1966

INVENTOR
PAUL K. SCHILLING
BY Robert M. Dunning
ATTORNEY

United States Patent Office 3,373,890
Patented Mar. 19, 1968

3,373,890
CONTAINER FOR CONTAINING FROZEN FOOD
Paul K. Schilling, St. Paul, Minn., assignor to Plastics, Inc., St. Paul, Minn., a corporation of Minnesota
Filed July 5, 1966, Ser. No. 562,814
6 Claims. (Cl. 220—22)

ABSTRACT OF THE DISCLOSURE

The invention relates to a serving dish structure designed for use by airlines and the like. The structure includes a dish having upwardly extending peripheral walls terminating in a peripheral edge. A divider structure is provided to divide the dish into sections. The divider section extends above the level of the peripheral dish edge and supports a disc-like cover in spaced relation to the dish. The dish is provided with a circular supporting flange extending downwardly therefrom. The divider structure includes upwardly extending projections at their outer extremities, extending above the level of the cover which is radially slotted to accommodate the projections. The circular flange of the dish is designed to extend between the upwardly extending projections of the divider structure of a similar container, holding them vertically aligned.

---

This invention relates to an improvement in a food container and deals particularly with a container for containing frozen food of the type which may be heated in a microwave or radar type oven for use in feeding the passengers of airliners or the like.

The increase in size in modern-day airliners, coupled with the considerable increase of speed of travel, has made the serving of meals to passengers an extremely difficult task. The serving can not really start until the airliner reaches a cruising altitude, and on trips of four or five hundred miles, the airplane starts its descent within minutes of the time it reaches cruising altitude. Thus the time for preparing the meals, placing various articles on the trays, and delivering the trays to 75 to 100 passengers is extremely small, particularly when it is considered that the trays must be picked up before the airplane lands. Any method or structure which is capable of simplifying the operation is of extreme importance to airline companies.

In an effort to speed up the serving operation, radar or microwave ovens have been produced capable of heating packaged frozen foods in an extremely short period of time. Ovens of this type simplify phases of the operation because of the fact that it is unnecessary to maintain certain of the foods at an elevated temperature until the foods are served. However, if the various foods on the plane are merely served onto the plate during the handling, the various foods on the plate become mingled together, greatly impairing the appearance of the served dishes. Furthermore, the various juices from the various foods mingle together and affect the flavor. As a result, it has been common practice to serve the heated food either in separate dishes, or in compartmented plates which require considerable storage space.

It has been found that many of the previous objections can be avoided by the use of a novel type of container including a plate which preferably includes an upturned marginal edge or rim. Dividers made of paperboard or a similar disposable material may be positioned upon the plate in order to divide the area of the plate into three or four separate compartments. The dividers follow the contour of the plate and form an effective barrier between the different compartments. The dividers are held in proper location partially by an overlying disc having marginal notches that interfit with the ends of the partitions. This disposable disc rests upon the dividers and serves as a platform upon which a similar container may be placed. Usually the entire container is placed in a plastic bag for sanitary reasons.

A feature of the present invention resides in the provision of a container which preferably includes a pair of intersecting partition members which are slotted to interfit one with the other. The two partition-forming members intersect at the center of the plate, and may intersect at right angles to form four equal compartments, or the partition members may be bent at the center to extend in any direction therefrom to form compartments of any desired proportions. As an example, if only three compartments are desired, the ends of two of the partition members may be extended in side by side relation to serve as a single partition.

A feature of the present invention resides in the provision of a compartmented-style dish useful in the storage of frozen foods and in holding the various foods separate during the heating process. When the food is to be served, the top disc and the partition-forming members are merely lifted from the plate and discarded. This permits the food of one compartment to move to some extent if the food is of such a nature. However, the food will remain mainly separated much as though it had just been served upon the plate by hand. A feature of the present invention resides in the structure described and in which the partition-forming members are of equal height throughout the major portion of their length, but are provided with terminal upwardly extending hook portions designed for accommodation in marginal notches in the disc-like cover to be held in a proper desired relationship.

A further feature of the present invention resides in the provision of a serving dish which may be used for the storage of frozen foods, usually comprising the major portion of a meal, and in which the food being stored may be substantially higher than the marginal edge of the plate itself. By using partitions or dividers for separating the area of the plate into compartments, and by making the separators or dividers taller than the depth of the plate, the food contained may be substantially deeper than the depth of the plate itself.

An added feature of the present invention resides in the fact that a means may be provided for holding the dividers in a predetermined angular relationship prior to the application of the cover panel to the partitions. This means may comprise a plug of plastic or similar material having slots extending the major portion of the height thereof which are designed to accommodate the center portions of the two separators or dividers. If the area of the plate is to be divided into four sections of generally equal size, the plug may be provided with two slots which intersect at right angles. If the area of the plate is to be divided into three larger compartments, a different form of plug may be used having three angularly related slots meeting at the center of the substantially cylindrical plug. In forming the three compartments, the ends of two of the dividers are flexed into face contact, and the other ends thereof are spaced apart a suitable distance, such as 120°.

These and other objects and normal features of the present invention will be more clearly and fully set forth in the following specification and claims.

In the drawings forming a part of the specification
FIGURE 1 is a perspective sectional view of the compartmented unit in assembled form.
FIGURE 2 is a vertical sectional view through one of the compartmented dishes, or showing the lower portion of a similar dish overlying the same.

Figure 1:
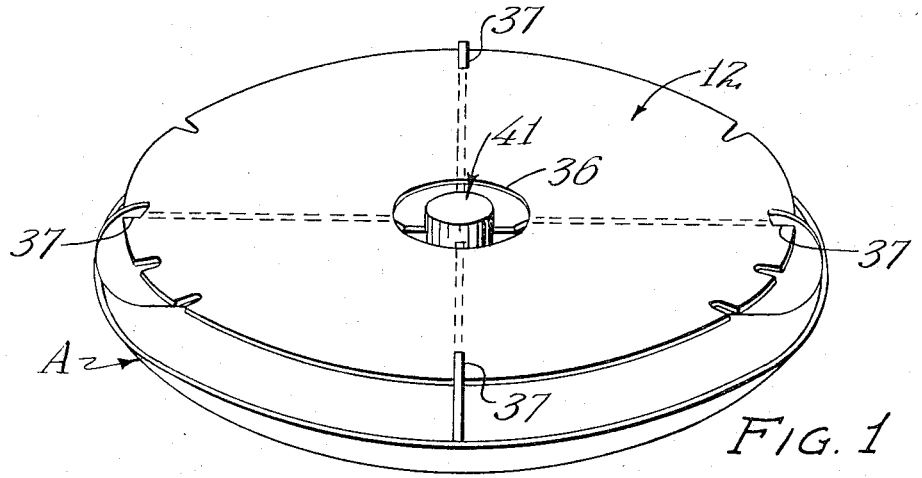
Figure 2:
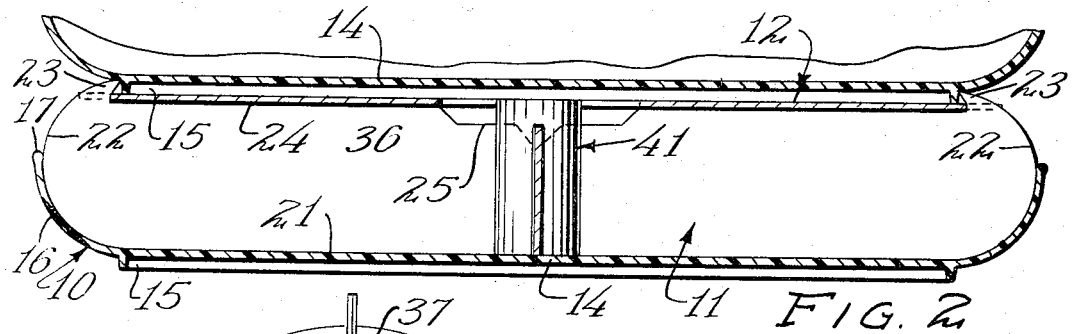

The present frozen food container is designed particularly for use on airliners and the like, although obviously it could not be limited to such use. The container is designed to contain food which is normally in a frozen state, and is intended to keep the food in certain compartments so that movement of the containers into and out of the airplane, as well as movement of the airplane in flight will not mix the foods in the individual compartments.

In general, the container is indicated by the letter A and includes a plate 10, a divider structure 11, and a covering disc 12. When filled, the combined container is usually enclosed within a bag such as 13 made of plastic sheeting.

The plate 10 is shown as including a circular flat bottom panel 14 having a downwardly projecting circular flange 15 thereupon. The rim 16 of the plate is preferably arcuate or substantially so and extends slightly less than 90° of a circle so that the plates may nest well together with the bottom surface of flange 15 of one plate resting upon the upper surface of the flat bottom panel 14 of the next lower plate. The rim 16 may be provided with a slightly enlarged beaded edge 17.

The partition structure 11 is formed by a partition member 19 and a partition member 20 which dovetail together. The partition member 19 includes a flat bottom edge 21, and arcuate ends 22 which are designed to follow the arcuation of the inner surfaces of the plate rim 16. The rounded end terminates at a hook-shaped projection 23 which extends slightly above the flat upper surface 24 of the partition member 19. A shallow notch 25 is provided in the flat upper surface 24 extending on opposite sides of the center of the flat upper surface 24. The partition member 19 is slit as indicated at 26, the slit extending from the flat lower edge 21 to a point substantially one-half way between the bottom and top flat surfaces 21 and 24 respectively. A V-shaped notch 27 is preferably provided at the base of the slip 26 to simplify the dovetailing of the two partition members.

The partition member or divider 20 also comprises an elongated strip of paperboard or similar material having a flat undersurface 29, and rounded ends 30 which are designed to fit the curvature of the plate edges 16. As will be understood, the partition members are substantially equal in length to the inner diameter of the plate rim and its upper extremity. The rounded ends 30 continue to form hook-shaped projections 31, the ends of which are connected to the flat upper edges 32 of the divider 20 along downwardly and outwardly inclined cut lines similar to those of the dividers 19. The upper flat surface 30 of the strip 20 is provided with a shallow notch 33 which extends somewhat to either side of the center line of the divider. A slit 34 is provided extending downwardly from the base of the notch 33 to a point substantially half-way to the lower surface 29 of the divider. A V-shaped notch 35 is provided in the base of the notch 33 communicating with the slit 34 to simplify the dovetailing of the two partition members together.

Figures 3, 6, 7, 8, 9:
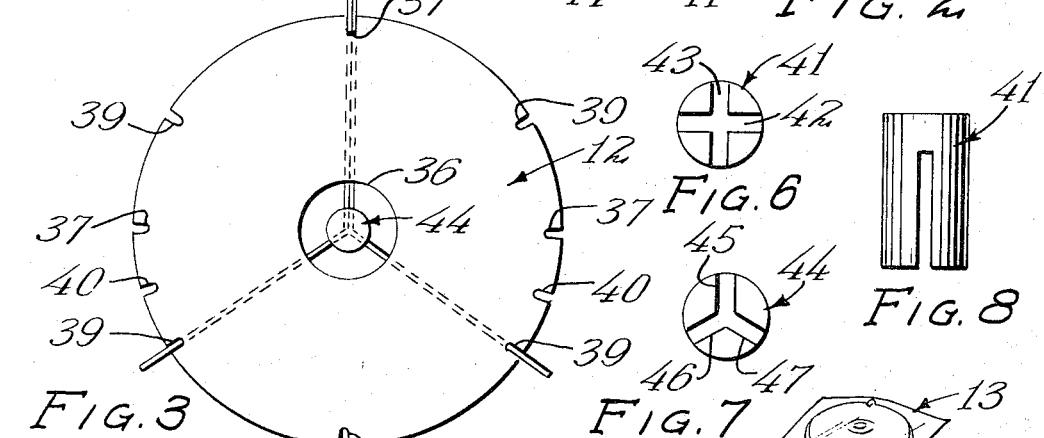
FIGURE 3 is a plan view of the dish when the partition-forming members are flexed to divide the dish into three compartments.
FIGURE 6 is a bottom plan view of one form of plug used in conjunction with the dividers when the dish it to be divided into four sections.
FIGURE 7 is a view similar to FIGURE 6 showing a different type of plug used when the plate is to be divided into three sections or compartments.
FIGURE 8 is a side elevational view of one of the plugs.
FIGURE 9 is a perspective view showing the completed dish enclosed within an outer enclosure such as a bag of plastic sheeting or similar material.
Figure 4:
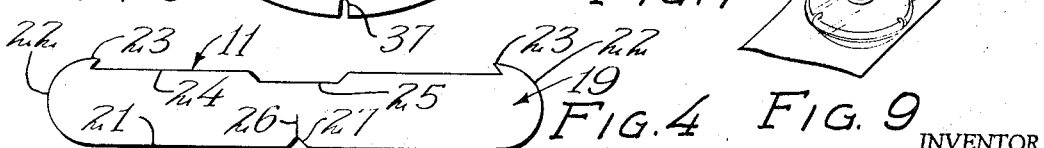
FIGURE 4 is an elevational view of one of the dividers or separators.
Figure 5:
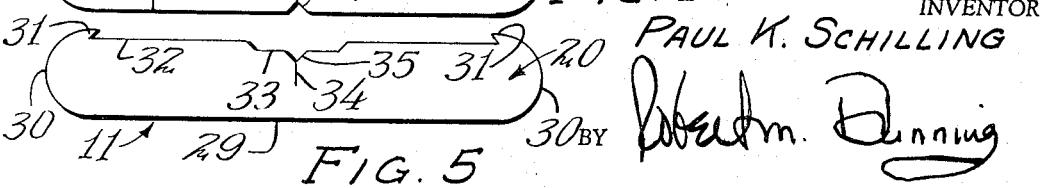
FIGURE 5 is an elevational view of the other of the dividers or separators.

As will be understood, the two partition members or dividers are interlocked by embracing the unslotted portion at the base of each of the slits 26 and 34 in the slit of the opposite strip. In view of the fact that the dividers are made of disposable material such as paperboard or the like, the ends of the dividers may be bent to extend in any desired direction from the center line. The dividers are shown in FIGURE 1 of the drawings intersecting at right angles to form four compartments of equal size. FIGURE 3 of the drawings shows ends of two of the dividers in face contact and the other ends of the dividers extendings at a relative angle of 120° to form three compartments of equal size. Obviously, the dividers may be arranged in such a manner as to form compartments of varying sizes if preferred.

The cover disc 12 is constructed as is best illustrated in FIGURES 1 and 3 of the drawings. The cover 12 includes a central aperture 36 which is concentered with the periphery of the disc, and which is of a diameter substantially equal to the width of the notches 25 and 33. The periphery of the cover 12 is provided with four notches 37 which are spaced apart an angular distance of 90°. The periphery of the cover also includes four notches 39 which are equally spaced from two opposed of the notches 37 an angular distance of about 30°. Two notches 40 are provided in one half of the periphery of the cover, the notches being located midway between notches 37 and 39 which are 30 degrees apart, the notches 40 being substantially 15° from the joining notches 37 and 39. Obviously, the specific angular distance is not of utmost importance but the arrangement provides a means of dividing the area of the dish into four equal compartments as shown in FIGURE 1, in three equal compartments as shown in FIGURE 3, or in a wide combination of compartments of varying sizes.

As may be seen in FIGURE 1 of the drawings, the notches 37, 39 and 40 are designed to accommodate the hook-shaped ends 23 and 31 of the dividers 19 and 20. The dividers fit tightly enough so that the hook-shaped ends do not become readily disengaged from the notches. Thus once the container is in the condition illustrated in FIGURE 1, it may be readily handled and moved around without materially displacing the contents, particularly when the contents are in a frozen condition.

In order to hold the dividers in proper relation prior to distributing the food into the various compartments, plugs of the type illustrated in FIGURES 6, 7 and 8 of the drawings may be employed. The plug 41 illustrated in FIGURES 6 and 8 of the drawing is shown as comprising merely a cylindrical body of plastic or other suitable material, the length or height of which does not exceed the distance between the upper surface of the bottom panel 14 of one container, and the other surface of the bottom panel 14 of the container next above, when the containers are in superimposed relation. The plug 41 is provided with two diametrically extending slots 42 and 43 which extend from one end of the plug a distance equal to the width of the dividers 19 and 20 between the bottom surfaces thereof and the bases of the notches 25 and 33. The plug 41 is placed with the dividers extending through the intersecting notches as indicated in FIGURE 1 of the drawings, the plug holding the dividers substantially in their proper positions while the plate is being filled. The plug prevents the dividers from relative hinging while the food is being placed upon the plate preparatory to applying the cover.

The plug 44 which is illustrated in FIGURE 7 of the drawings is similar to that shown in FIGURE 6 except for the fact that the plug 44 includes three radially extending notches 45, 46 and 47 which are arranged at angles of 120°. The plug 44 is used when the partitions are positioned in the manner illustrated in FIGURE 3 of the drawings.

It should be noted that the hook ends 23 and 31 of the dividers 19 and 20 serve not only to hold the dividers in proper relation to the cover disc 12, but also serve to prevent sliding of one container relative to the other when they are stacked in superimposed relation. As will be noted, the flange 15 of one container will fit between the hook ends 23 and 31 of the dividers of a container next above.

In operation, the dividers 19 and 20 are placed in the proper relation on the plate 10 to provide compartments of proper proportions to accommodate the food to be placed thereupon. The compartments may be loaded with the food, and the cover panel 12 applied by placing this panel over the partition structure and engaging the hook ends of the dividers in the proper notches. The assembled structure is usually then placed in a plastic bag to keep it in a sterile condition.

Just prior to use, the plate and its contents is placed in a microwave or radar type oven and heated. The cover panel 12, the divider unit 11 and the plug such as 41 or 44 is then removed and the plate is ready to be served.

The entire construction may be produced at a sufficiently low cost that the entire unit may be discarded after use if desired. Alternatively, the plate 10 and the plug such as 41 or 44 may be retained and the partition structure 11 and cover 12 may be discarded.

In accordance with the patent statutes, I have described the principles of construction and operation of my improvement in a food container, and while I have endeavored to set forth the best embodiment thereof, I desire to have it understood that changes may be made within the scope of the following claims without departing from the spirit of my invention.

I claim:
1. A container for food and the like comprising a dish having an upwardly curved peripheral wall terminating at its upper edge in a peripheral marginal edge,
a disposable divider structure resting upon said dish and dividing the dish into a series of sections,
said divider structure extending upwardly substantially above the level of said peripheral marginal edge, and
a disposable disc-like cover overlying said divider and held in position thereby, the periphery of said disc being spaced substantially from said peripheral edge of said dish to provide a ring-shaped air space therebetween.

2. The structure of claim 1 and including a circular downwardly projecting flange on said dish, and in which said cover is recessed below the upper extremity of said divider structure and is designed to accommodate the flange of a similar dish resting thereupon.

3. The structure of claim 1 and in which said divider structure includes upwardly extending projections adjacent the end extremities thereof between which said cover is supported below the level of the upper extremities of the divider structure.

4. The structure of claim 3 and in which said dish includes a downwardly projecting generally circular flange adapted to rest upon the cover of a similar container inwardly of said upwardly extending projections.

5. The structure of claim 1 and including a plug having radial slots therein adapted to embrace a center portion of said divider structure, and which is of equal height to the center portions of the divider structure to provide a spacer between the center of said dish and the center of said cover.

6. The structure of claim 5 and in which said divider structure includes upwardly extending projections at the end extremities thereof extending above the level of said plug.

References Cited
UNITED STATES PATENTS

| | | | |
|---|---|---|---|
| 1,754,812 | 4/1930 | Zacharis | 220—22 |
| 1,912,505 | 6/1933 | Weston | 220—22 |
| 2,496,964 | 2/1950 | Steinhauer | 220—22 |
| 2,903,127 | 9/1959 | Dorman | 220—22 X |
| 2,965,501 | 12/1960 | Harriss | 220—46 |
| 3,067,903 | 12/1962 | Jones | 220—22 |

THERON E. CONDON, *Primary Examiner.*

GEORGE E. LOWRANCE, *Examiner.*